United States Patent [19]
Appel et al.

[11] Patent Number: 5,287,125
[45] Date of Patent: Feb. 15, 1994

[54] RASTER OUTPUT SCANNER WITH PROCESS DIRECTION SPOT POSITION CONTROL

[75] Inventors: James J. Appel, Brighton; Kenneth R. Ossman, Macedon, both of N.Y.

[73] Assignee: Xerox Corporation, Stamford, Conn.

[21] Appl. No.: 740,543

[22] Filed: Aug. 5, 1991

[51] Int. Cl.[5] .............................................. H04N 1/21
[52] U.S. Cl. ..................................... 346/108; 359/206
[58] Field of Search ............... 346/108, 76 L, 160, 346/1.1, 107 R; 358/481, 296, 300, 302; 359/206, 207, 216

[56] References Cited

U.S. PATENT DOCUMENTS

| | | | |
|---|---|---|---|
| 4,040,096 | 8/1977 | Starkweather | 358/302 |
| 4,121,883 | 10/1978 | Goshima et al. | 359/219 |
| 4,404,596 | 9/1983 | Juergensen et al. | 358/296 |
| 4,453,170 | 6/1985 | Arao | 346/160 |
| 4,600,837 | 7/1986 | DiStefano et al. | 250/235 |
| 4,660,094 | 4/1987 | Yoshimoto et al. | 358/285 |
| 4,858,019 | 8/1989 | Ohara et al. | 358/474 |
| 4,971,413 | 11/1990 | Inoue | 350/6.8 |

FOREIGN PATENT DOCUMENTS

| | | | |
|---|---|---|---|
| 61-295526 | 12/1986 | Japan | G02B 26/10 |
| 2-163721 | 6/1990 | Japan | G02B 26/10 |
| 3-120509 | 5/1991 | Japan | G02B 26/10 |

Primary Examiner—Mark J. Reinhart

[57] ABSTRACT

Compensation for process direction photoreceptor motion in a Raster Output Scan system is provided by moving the cylinder lens located between the laser source and a rotating spot scanning mechanism, e.g., a polygon. The cylinder lens is moved in the process direction in response to error signals generated by a SOS detector and timing marks on the photoreceptor drum surface, or an encoder on the drum shaft. The lens movement is obtained by sending motion error signals to a piezoelectric actuator which increases in length to impart the desired motion to the cylinder lens.

4 Claims, 2 Drawing Sheets

RASTER OUTPUT SCANNER WITH PROCESS DIRECTION SPOT POSITION CONTROL

BACKGROUND AND MATERIAL DISCLOSURE STATEMENT

This invention relates generally to a raster output scanning system for producing a high intensity imaging beam which scans across a movable photoconductive member to record electrostatic latent images thereon, and, more particularly, to an apparatus for providing controlled registration of the beam in the process direction movement of the photoconductive member.

In recent years, laser printers have been increasingly utilized to produce output copies from input video data representing original image Information. The printer uses a raster output scanner (ROS) to expose the charged portions of the photoconductive member to record the electrostatic latent image thereon. Generally, a raster output scanner has a laser for generating a collimated beam of monochromatic radiation. The laser beam is modulated in conformance with the image information. The modulated beam is reflected through a lens onto a scanning element, typically a rotating polygon having mirrored facets. The light beam is reflected from a facet and thereafter focused to a "spot" on the photosensitive member. The rotation of the polygon causes the spot to scan linearly across the photoconductive member in a fast scan (i.e., line scan) direction. Meanwhile, the photoconductive member is advanced relatively more slowly than the rate of the fast scan in a slow scan direction which is orthogonal to the fast scan direction. In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper.

Data in each of the fast and slow scan directions is generally sampled. The sampling rate of the slow scan direction data equates to 300 lines per inch or more In many printing apparatus. It has been shown that errors in the slow scan direction of as small as 1% of the nominal line spacing may be perceived in a half tone or continuous tone image. This implies a need for a high degree of control in positioning the spot in the slow scan direction on the image plane, especially in such applications as multiple beam and multiple ROS color printers where a plurality of spots are written onto a single photoreceptor. Furthermore, high resolution printing, on the order of 600 spots per inch or higher, demands very accurate spot positioning.

Errors of the spot position in the slow scan direction arise from many sources, including polygon and/or photosensitive member motion flaws, facet and/or image plane (e.g., photosensitive medium) surface defects, etc. These errors are most commonly addressed by passive or active in-line optics. Some prior art examples are disclosed in:

U.S. Pat. No. 4,600,837 to DiStefano et al. discloses an optical scanning apparatus with dynamic scan path control wherein a scan path is altered by two different prisms, which are positioned before a polygon in the scan path. The two prisms alter the scan path in both a horizontal and a vertical direction. The two prisms are controlled by error signals generated by a grating. A phase error resulting from a comparison of the grating signals with a system clock is shown in FIG. 5. See Col. 5, lines 41-66.

U.S. Pat. No. 4,660,094 to Yoshimoto et al. discloses a method of focus adjustment of a picture scanning and recording system wherein a projection lens is moved automatically in a direction normal to a recording drum to correct for drum variations caused by machining or environmental conditions, such as temperature. A rotary encoder generates pulses which are representative of the recording drum's rotation. The pulses are used by a motor to move a mirror assembly closer to or farther away from the drum. An image sensor, within the light path, detects when the beam is out of focus and adjusts it. See Col. 2, lines 31-64.

U.S. Pat. No. 4,040,096 to Starkweather discloses a basic polygon ROS structure having runout and/or facet errors (both scanning errors in the slow scan direction) by locating a cylindrical lens in the optical path, either pre- or post- polygon, which focuses the beam in the slow scan direction onto the desired focal plane.

U.S. Pat. No. 4,858,019 to Ohara et al. discloses a light scanning recording device wherein a recording medium's speed is determined by counting pulses generated by a reference clock signal. The pulses, which are inversely related to scanning speed, are fed back to control the speed of the recording medium. Another feed back signal is used to control polygon speed. See Col. 3, lines 43-55.

Also, relevant disclosures are contained in U.S. patent applications assigned to the same assignee as the present invention. Each of the contents of these applications are hereby incorporated by reference.

Each of these various prior art schemes have disadvantages or shortcomings. For example, the use of high quality optics requires not only high quality optical elements, but also tight control in the positioning of those optics, in order to obtain the requisite very precise mechanical control sufficient to adjust spot position 0.02 mm or less, required in many cases. In order to achieve this level of spot position control with the acousto-optic modulators, an acoustic wave must be established and maintained with great precision. These acousto-optic modulators are relatively quite expensive, and require an associated accurate high frequency signal generator and related electronics to produce and maintain the acoustic waves. Further, those systems which incorporate feedback circuits to move rotating mirrors or translating roof mirrors are generally too slow to correct for motion quality errors because these relatively bulky mirror components are difficult to move precisely and quickly.

According to the present invention, the ROS system includes a cylinder lens in the prepolygon optics to focus the beam in the slow scan direction onto the polygon facets. The cylinder lens, a relatively light optical component in the prepolygon optical path, is adapted to be moved in the plane parallel to the process direction plane, so as to correct the location of the scanned beams at the photoreceptor. The correction Is enabled by providing a phase error feedback circuit for generating error signals which are sent to a pizeo-electric actuator to provide high frequency control in the process direction of the position of the cylinder lens. The invention is especially intended to provide compensation for photoreceptor motion (vibration) errors in the range of approximately 0-150 hz.

More particularly the present invention relates to a light scanning apparatus comprising:

means for generating a laser beam, means for modulating the amplitude of the beam in accordance with input video data, a multi-faceted reflector polygon positioned in the beam path, means for rotating the polygon, the beam being reflected from successive facets of the polygon and sweeping along a scan path to provide successive scan lines along the surface of the photoreceptor moving in the process direction, the improvement comprising a cylinder lens located between said laser generating means and said polygon, said cylinder lens focusing the output of said laser in the process direction, and means for moving said cylinder lens in a plane parallel to the process direction to correct for scan line image motion quality errors occurring at the photoreceptor in the process direction.

DETAILED DESCRIPTION OF THE INVENTION

Figure 1:
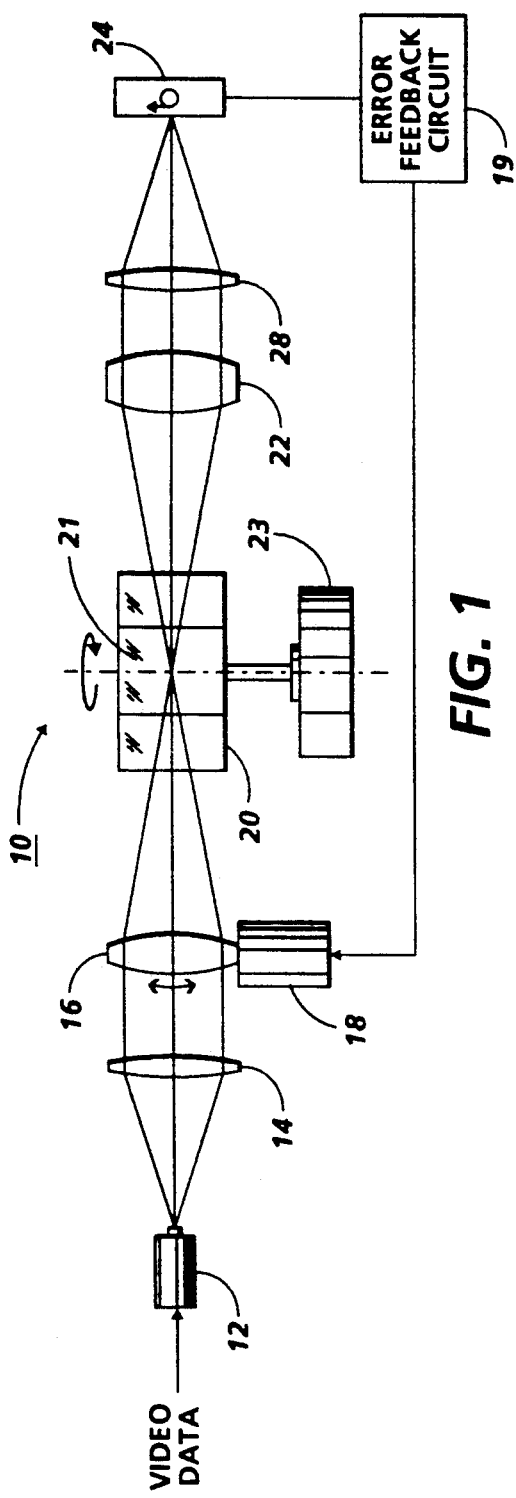
FIG. 1 shows a side view of the general optical configuration of a Raster Output Scanner (ROS) system according to one embodiment of the present invention, showing a movable cylinder lens disposed between the light source and the rotating polygon.
Figure 2:
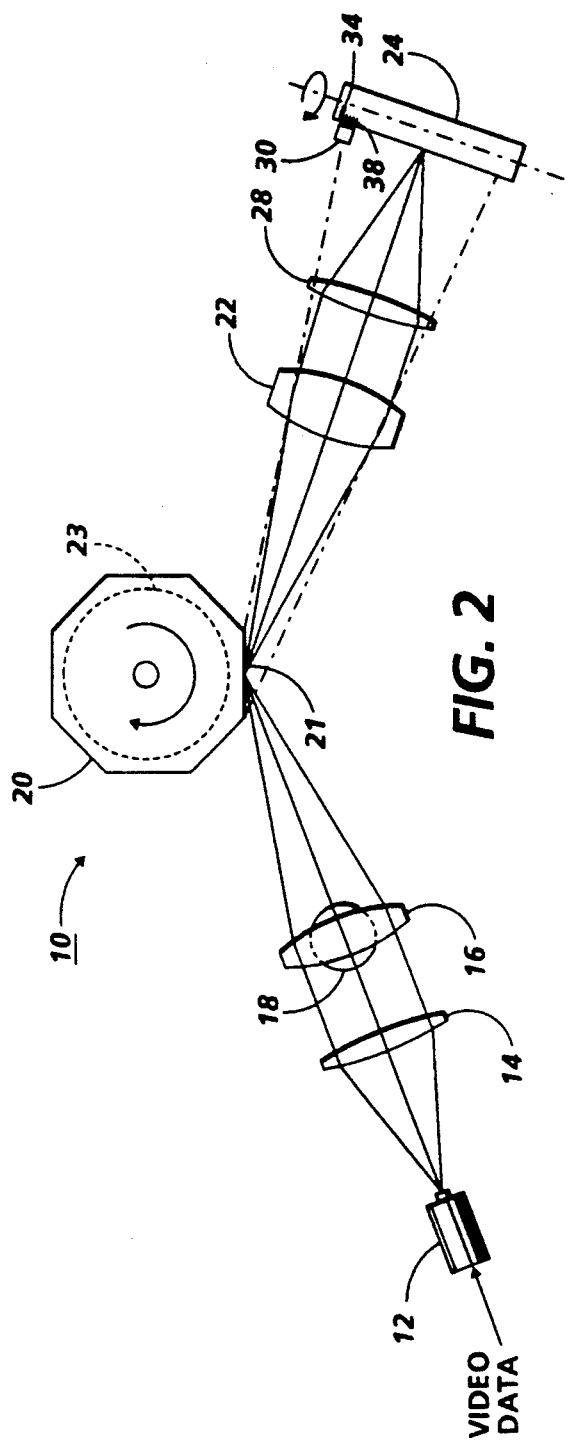
FIG. 2 shows top or plan view of the ROS system of FIG. 1.

FIGS. 1 and 2 show a side and top schematic view, respectively, of a ROS system incorporating the present invention. Input video data is transmitted to a self-modulating light source 12, such as a low powered solid state laser diode, which produces a modulated diverging beam of coherent light. The beam is collimated by a spherical collimating lens 14 and enters cylindrical lens 16. Cylindrical lens 16 serves to focus the beam in the slow scan (process) direction. According to the principles of the present invention, lens 16 is movable in the process direction by a pizeo-electric actuator 18 in response to motion error signals sent to actuator 18 from error feedback circuit 19 described in further detail below.

The beam is next incident upon a rotating polygon 20 having at least one mirrored facet 21. (Other suitable devices for scanning include rotating hologons, rotating diffraction gratings, etc.) As shown most clearly in FIG. 2, the rotation of the mirrored facets causes the beam to be deflected and thereby scanned across a photosensitive image member which in a preferred embodiment is a photoreceptor drum 24. The ROS illuminates the charged portion of drum 24 at a rate of about 400 pixels per inch; e.g. at 400 spi resolution.

Returning to FIG. 1a, postscan optics system 22 reconfigures the beam reflected by facet 21 to a circular or elliptical cross-section, refocuses the beam to the proper point on the surface of photoreceptor/drum 24, and corrects for scan nonlinearity (f-theta correction). A 1× (or other working magnification) toroidal lens 28 is disposed between the scanning device 20 and the photoreceptor 24 to correct for wobble (scanner motion or facet errors) where appropriate.

FIG. 1 is a view of system 10 oriented so that the process direction is parallel to, or in the plane of the page on which the figure is printed, while the fast scan direction is perpendicular to the plane of the page. The opposite is true for FIG. 2. Thus, if polygon 20 is rotated in a clockwise fashion, as shown in FIG. 2, a beam reflected from one of its moving facets will be caused to scan from left to right on the photoreceptive drum 24. By combining this rotation of polygon 20 with rotation of the photoreceptor drum 24 In a clockwise fashion, as shown in FIG. 1, scanning may proceed in a top to bottom, raster manner. Polygon 20 is preferably driven by a motor 23 through a shaft, with the angular velocity of polygon 20 synchronized with the angular velocity of drum 24.

It is evident from the above description that cylinder lens 16 controls the location of the spot of the photoreceptor surface in the slow scan process direction. Thus, if the cylinder lens is moved in the process direction, it will move the location of the scanned spot in the same direction and in an amount dependent on system magnification. For example, if the cylinder lens is moved one micron in a vertical direction in FIG. 1, the image at the polygon facet 21 will move one micron in the same direction. Since the polygon facet is imaged at the photoreceptor surface, the spot will move at the photoreceptor an amount dependent on the magnification of the wobble correcting system (lens 28). For a 1× lens 28, the spot would move one micron at the photoreceptor.

Figure 3:
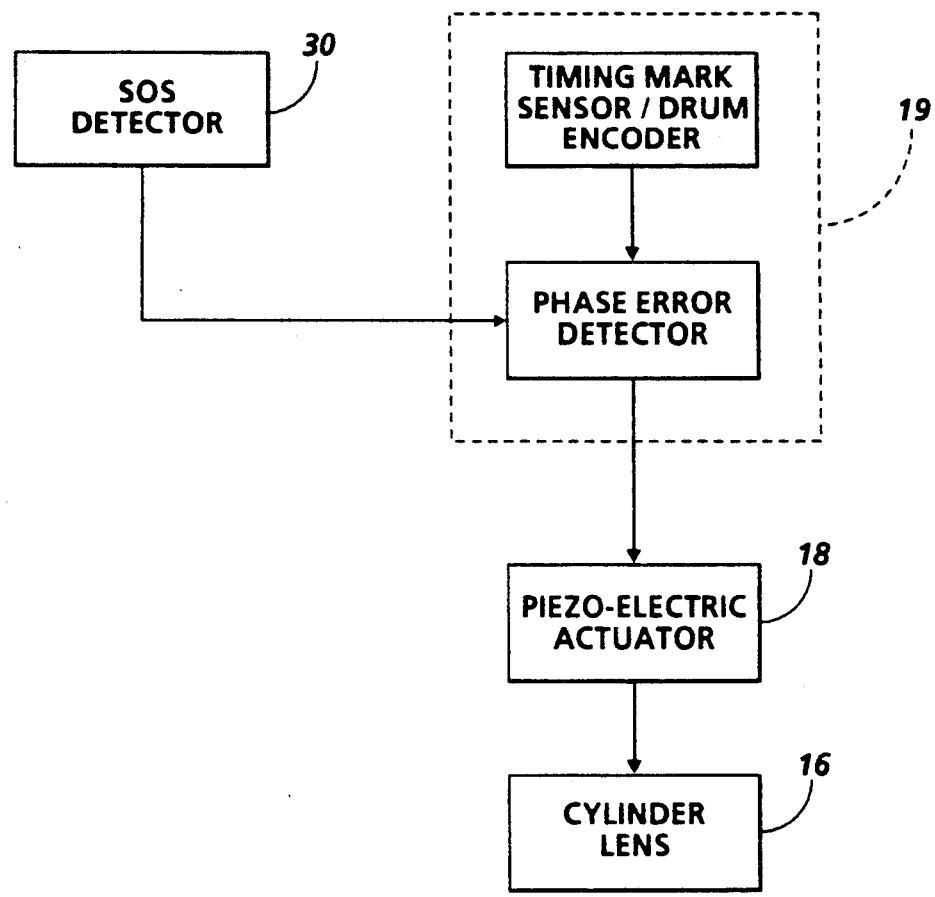
FIG. 3 shows a flow diagram illustrating the control for regulating the position of the cylinder lens shown in FIG. 1.

FIG. 3 illustrates one embodiment of an error detection and feedback control circuit for determining the existence and extent of the rotational error of drum 24 and for controlling the operation of actuator 18 so as to move lens 16 the required distance to correct the error.

Referring to FIGS. 2 and 3, FIG. 2 shows a start of scan sensor 30 positioned adjacent to the photoreceptor drum. Each time a scanning beam sweeps across the drum surface and passes over sensor 30, a start of scan signal is emitted. The sensor emits signals at a frequency equal to the system slow scan resolution, e.g. 4000 Hz for a 10 ips process speed with 400 lpi slow scan resolution. A set of timing marks, 34, spaced 1/4100th of an inch apart, or some other appropriate spacing are located along the side of the drum. These timing marks are sensed by a light source/detector combination and provide the basic timing signals for the synchronization of the control system. Alternatively, the timing signals can be generated by a shaft encoder mounted on the photoreceptor drum shaft.

As the beam scans across the SOS detector 30, it generates timing pulses. The beam is initially aligned and adjusted with some relationship to the occurrences of the drum timing marks. A phase detector detects the phase difference between the signal from the SOS detector 30 and the timing marks on the drum and generates a phase error voltage that represents the phase error and polarity. This signal is fed to pizeoelectric actuator 18 which transmits the induced, mechanical motion to the cylinder lens 16 to make the necessary process direction correction. Actuator 18, in a preferred embodiment, is a Burleigh model PLZ-020.

According to a still further aspect of the present invention, when the cylinder lens is moved in the process direction, perpendicular to the optical axis, a slightly different portion of the collimated beam is selected at each location. By making the diameter of the collimated beam slightly larger than the aperture of the cylinder lens, the cylinder lens will always be the limiting aperture in the system. Since the cylinder lens is moving such a small distance (<0.02 mm), the effect of selecting different sections of the collimated beam on photoreceptor exposure will be negligible.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. A light scanning apparatus comprising:
   means for generating a laser beam,
   means for modulating the amplitude of the beam in accordance with input video data,
   a multi-faceted reflector polygon positioned in the beam path,
   means for rotating the polygon, the beam being reflected from successive facets of the polygon and sweeping along a scan path to provide successive scan lines along the surface of a photoreceptor moving in the process direction, the improvement comprising a cylinder lens located between said laser generating means and said polygon, said cylinder lens focusing the output of said laser in the process direction, and means for moving said cylinder lens in a plane parallel to the process direction to correct for scan line image motion quality errors occurring at the photoreceptor in the process direction.

2. A laser printer of the type which forms an image on a photoreceptor surface in response to an image data signal, comprising:
   a laser source for generating a coherent light beam,
   modulating means for modulating the light beam generated by said light source in response to said image data signal,
   scanning means for scanning the light beam produced by said light source and modulated by said modulating means on to the surface of said photoreceptor in a raster fashion, and
   electro-optic means for controlling the slow scan direction position of the light beam at the point that it is incident upon the photoreceptor, said control means disposed in the optical path between the laser source and the scanning means, said electro-optic means including a cylinder lens adapted to be moved in a process direction in response to beam position error signals to control the slow scan position of the light beam and beam position error detecting means for detecting slow scan direction positional errors of the beam at said photoreceptor, and for providing an error correction signal in response to a detected positional error.

3. The laser printer of claim 2 wherein said electro-optic means further includes a pizeo-electric actuator to control the process direction displacement of said cylinder lens, said actuator being responsive to said error correction signals.

4. The laser printer of claim 2 further including means for collimating said coherent light beam generated by said laser source, the diameter of said collimated beam being slightly larger than the aperture of said cylinder lens.

* * * * *